United States Patent
Feng et al.

(10) Patent No.: US 11,614,382 B2
(45) Date of Patent: Mar. 28, 2023

(54) SAMPLING ASSEMBLY, SAMPLE ANALYZER AND SAMPLING METHOD

(71) Applicant: SHENZHEN MINDRAY BIO-MEDICAL ELECTRONICS CO., LTD., Shenzhen (CN)

(72) Inventors: Xiang Feng, Shenzhen (CN); Jin Teng, Shenzhen (CN); Zixian Xie, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 612 days.

(21) Appl. No.: 16/729,449

(22) Filed: Dec. 29, 2019

(65) Prior Publication Data
US 2020/0132571 A1     Apr. 30, 2020

Related U.S. Application Data

(63) Continuation of application No. PCT/CN2018/093453, filed on Jun. 28, 2018.

(30) Foreign Application Priority Data

Jun. 30, 2017   (WO) ................ PCT/CN2017/091344

(51) Int. Cl.
*G01N 1/14*   (2006.01)
*B01L 3/00*   (2006.01)
*B01L 5/00*   (2006.01)

(52) U.S. Cl.
CPC ................ *G01N 1/14* (2013.01); *B01L 3/502* (2013.01); *B01L 5/00* (2013.01); *B01L 2300/06* (2013.01);
(Continued)

(58) Field of Classification Search
CPC .. G01N 1/14; G01N 35/1009; G01N 35/1079; B01L 3/502; B01L 5/00;
(Continued)

(56) References Cited

U.S. PATENT DOCUMENTS 5,474,744 A    12/1995  Lerch
5,558,838 A     9/1996  Uffenheimer
(Continued)

FOREIGN PATENT DOCUMENTS

CN    101495872 A    7/2009
CN    101765775 A    6/2010
(Continued)

*Primary Examiner* — Robert R Raevis
(74) *Attorney, Agent, or Firm* — Kory D. Christensen

(57) ABSTRACT

A sampling assembly, including a sampling needle, a first pipeline, a second pipeline, a driving member, a first switching member, and a second switching member, is disclosed. The first pipeline is connected between the sampling needle and the first switching member. The second pipeline is connected between the first switching member and the driving member. The first switching member is used for connecting or disconnecting the first pipeline and the second pipeline. The second pipeline is connected, by means of the second switching member, to a negative pressure source. The sampling time of the sampling assembly of the present disclosure is relatively short. The present disclosure further discloses a sample analyzer and a sampling method.

19 Claims, 7 Drawing Sheets

(52) U.S. Cl.
CPC .............. *B01L 2300/0832* (2013.01); *B01L 2400/0487* (2013.01)

(58) Field of Classification Search
CPC ......... B01L 2300/06; B01L 2300/0832; B01L 2400/0487
USPC ... 73/863.83, 64.56, 864.11, 864.15, 864.21, 73/864.23, 864.24, 8, 64.25, 864.35, 73/864.73, 864.74, 864.81; 422/501, 512, 422/522, 524
See application file for complete search history.

(56) References Cited

U.S. PATENT DOCUMENTS

| | | | |
|---|---|---|---|
| 5,853,665 | A | 12/1998 | Ade et al. |
| 2002/0001675 | A1 | 1/2002 | Tisone |

FOREIGN PATENT DOCUMENTS

| | | |
|---|---|---|
| CN | 202179724 U | 4/2012 |
| CN | 202305273 U | 7/2012 |
| CN | 103575633 A | 2/2014 |
| CN | 104406822 A | 3/2015 |
| CN | 204269420 U | 4/2015 |
| CN | 105699299 A | 6/2016 |
| EP | 0651255 A1 | 5/1995 |

SAMPLING ASSEMBLY, SAMPLE ANALYZER AND SAMPLING METHOD

CROSS-REFERENCE TO RELATED APPLICATIONS

This application is a continuation of Patent Cooperation Treaty Application No. PCT/CN2018/093453, filed on Jun. 28, 2018, which claims priority and benefits of Patent Cooperation Treaty Application No. PCT/CN2017/091344, filed on Jun. 30, 2017. These applications are hereby incorporated by reference in their entireties.

TECHNICAL FIELD

The present disclosure relates to the technical field of medical instruments, in particular to a sampling assembly, a sample analyzer and a sampling method.

BACKGROUND

A blood cell analyzer needs to draw biological samples from sealed test tubes for analysis. Since pressure is commonly present in the sealed test tubes, the pressure will have adverse effects on the accuracy of sampling. Therefore, how to solve the problem of accurate sampling from sealed test tubes is a common problem in the industry.

The current solution usually performs punctures twice. The first puncture with the sampling needle is a puncture pretreatment for releasing the pressure in the test tube, then the sampling needle is cleaned, and next, the sampling needle performs the second puncture to draw the biological sample. As the sampling needle needs to perform punctures twice and be cleaned between the two punctures, the sampling speed of the blood cell analyzer is directly restricted, resulting in slow measurement speed of the blood cell analyzer.

SUMMARY

The technical problem to be solved by the present disclosure is to provide a sampling assembly, a sample analyzer and a sampling method that require less time for sampling.

In one aspect, there is provided a sampling assembly including a sampling needle, a first pipeline, a second pipeline, a driving member, a first switching member and a second switching member, wherein the first pipeline is coupled between the sampling needle and the first switching member, the second pipeline is coupled between the first switching member and the driving member, the first switching member is used for connecting or disconnecting the first pipeline to or from the second pipeline, and the second pipeline can be connected to a negative pressure source via the second switching member.

The second pipeline can also be connected to the atmosphere via the second switching member. In other words, the second pipeline can be connected to a negative pressure source and the atmosphere via the second switching member.

The second switching member may include a first port and a second port, the first port is connected to the second pipeline, the second port is connected to the negative pressure source, and the second switching member can connect the first port to the second port.

The second switching member may include a first port, a second port and a third port, the first port is connected to the second pipeline, the second port is connected to the negative pressure source, the third port is connected to the atmosphere, and the second switching member can connect the first port to the second port or connect the first port to the third port.

The second switching member may include a first sub-switching member with two ends connected to the second pipeline and the negative pressure source, respectively, the first sub-switching member being used for connecting or disconnecting the second pipeline to or from the negative pressure source. The second switching member may further include a second sub-switching member with two ends connected to the second pipeline and the atmosphere, respectively, the second sub-switching member being used for connecting or disconnecting the second pipeline to or from the atmosphere.

The negative pressure source may include a gas storage tank, negative pressure is formed in the gas storage tank, and the gas storage tank is connected to the second pipeline to cause the second pipeline to be in a negative pressure state.

The pressure value of the negative pressure in the gas storage tank may be less than or equal to −30 kPa.

The sampling needle may include a needle body and a needle head which are arranged in a direction of a lengthwise axis, the needle body and the needle head are internally provided with a fluid passage in communication with each other, and the fluid passage extends in the direction of the lengthwise axis with an opening at one end arranged in the needle head; the needle body has a closed outer surface; and the needle head includes a tip portion, the tip portion includes a first end, a second end, and a smooth side surface extending between the first end and the second end, the first end of the tip portion is arranged on a side away from the needle body, the second end thereof is arranged on a side close to the needle body, and the tip portion is a blunt end.

The first end of the tip portion may be coupled to the side surface via a first transition cambered surface, and a radius of the first transition cambered surface is less than or equal to 0.1 mm.

An extension direction of the side surface of the tip portion forms a first included angle with respect to the lengthwise axis, and the first included angle is greater than or equal to 20° and less than or equal to 40°.

A radial dimension of the second end of the tip portion may be greater than or equal to one-half of a radial dimension of the needle body.

The needle head may further include a first transition portion which is positioned between the needle body and the tip portion and is coupled to the needle body and the tip portion; and one end of the first transition portion that is coupled to the tip portion has a first radial dimension, and one end of the first transition portion that is coupled to the needle body has a second radial dimension, the first radial dimension being less than the second radial dimension.

The first transition portion may include an outer surface extending between the two ends thereof, an extension direction of the outer surface forms a second included angle with respect to the lengthwise axis, and the second included angle may be less than or equal to 10°.

The first transition portion may be a truncated cone structure having a smooth outer surface, the first radial dimension may be less than the radial dimension of the needle body, and the second radial dimension may be equal to the radial dimension of the needle body.

The needle head further may include a second transition portion which is located between the first transition portion and the tip portion and is coupled to the first transition portion and the tip portion; and the second transition portion is coupled to the second end of the tip portion via a second transition cambered surface, and a radius of the second transition cambered surface is 0.1 mm to 1 mm.

An opening at one end of the fluid passage may be arranged in the second transition portion, and an included angle of more than 0° and less than or equal to 90° is formed between the direction of the opening and the direction of the lengthwise axis.

The second transition portion may be a cylindrical structure having a constant radial dimension, and the radial dimension of the cylindrical structure may be less than the radial dimension of the needle body and equal to the radial dimension of the second end of the tip portion.

An opening at one end of the fluid passage may be arranged in the side surface of the tip portion.

An outer contour of any cross section of the needle body in a direction perpendicular to the lengthwise axis may be circular or elliptical, and the tip portion is a conical structure or a truncated cone structure that tapers from its second end to its first end.

The driving member may include a syringe.

In another aspect, there is further provided a sample analyzer including the sampling assembly described above.

In yet another aspect, there is further provided a sampling method. The sampling method uses a sampling assembly for sampling, the sampling assembly includes a sampling needle, a first pipeline, a second pipeline, a driving member, a first switching member and a second switching member. The first pipeline is coupled between the sampling needle and the first switching member. The second pipeline is coupled between the first switching member and the driving member. The first switching member is used for connecting or disconnecting the first pipeline to or from the second pipeline. The second pipeline is connected to a negative pressure source via the second switching member.

The sampling method may include after the first switching member disconnects the first pipeline from the second pipeline, the sampling needle penetrating a cap of a test tube and extending into the test tube; the second switching member connecting the second pipeline to the negative pressure source; after the second switching member disconnects the second pipeline from the negative pressure source, the first switching member connecting the first pipeline to the second pipeline; the driving member drawing a biological sample from the test tube into the sampling needle; and after the first switching member disconnects the first pipeline from the second pipeline again, the sampling needle exiting the test tube.

The second switching member may include a first port and a second port, the first port is connected to the second pipeline, the second port is connected to the negative pressure source, and the second switching member can connect the first port to the second port. The sampling method further includes: the second switching member connecting the second pipeline to the negative pressure source again; and after the second switching member disconnects the second pipeline from the negative pressure source again, the first switching member connecting the first pipeline to the second pipeline again.

A front-end gas column may be formed at one end of the sampling needle away from the first pipeline when the first switching member connects the first pipeline to the second pipeline again. The sampling method further includes: the driving member forcing the front-end gas column out of the sampling needle.

The step of "the sampling needle exiting the test tube" and the step of "the second switching member connecting the second pipeline to the negative pressure source again" may be performed simultaneously.

The second pipeline can also be connected to the atmosphere via the second switching member. The sampling method may further include the second switching member connecting the second pipeline to the atmosphere; and after the second switching member disconnects the second pipeline from the atmosphere, the first switching member connecting the first pipeline to the second pipeline again.

The step of "the sampling needle exiting the test tube" and the step of "the second switching member connecting the second pipeline to the atmosphere" may be performed simultaneously.

The second switching member includes a first port, a second port and a third port, the first port is connected to the second pipeline, the second port is connected to the negative pressure source, the third port is connected to the atmosphere, and the second switching member can connect the first port to the second port or connect the first port to the third port.

The second switching member includes: a first sub-switching member with two ends connected to the second pipeline and the negative pressure source, respectively, the first sub-switching member being used for connecting or disconnecting the second pipeline to or from the negative pressure source; and a second sub-switching member with two ends connected to the second pipeline and the atmosphere, respectively, the second sub-switching member being used for connecting or disconnecting the second pipeline to or from the atmosphere.

The step of "the sampling needle penetrating a cap of a test tube and extending into the test tube" and the step of "the second switching member connecting the second pipeline to the negative pressure source" may be performed simultaneously.

The step of "the sampling needle penetrating a cap of a test tube and extending into the test tube" may further includes the sampling needle penetrating a cap of a test tube and extending into the test tube, and remaining therein for a predetermined time after entering; and the sampling needle continuing to extend further into the test tube to immerse the needle head of the sampling needle into the biological sample.

The sampling disclosed assembly can control the pressure environment of the first pipeline through motions of the first switching member and the second switching member, thereby eliminating the adverse influence of the pressure in the sealed test tube on the sampling accuracy. Therefore, when the sampling assembly is used for sampling, the sampling can be achieved simply by puncturing with the sampling needle once, and the procedures of puncture pretreatment and cleaning the sampling needle after the puncture pretreatment are no longer needed, thus shortening the sampling time and improving the sampling speed. Since the sampling process is a key path for measurement of the sample analyzer, sampling by the sampling assembly shortens the measurement time of the sample analyzer and improves the measurement speed of the sample analyzer. Moreover, only one puncture is needed for sampling by using the sampling assembly, so that the wear of the sampling needle can be reduced as well, thus prolonging the service life of the sampling needle.

BRIEF DESCRIPTION OF THE DRAWINGS

In order to explain the technical solution of the present disclosure more clearly, the drawings needed in the implementation will be briefly introduced in the following. The drawings in the following description are only some embodiments of the present disclosure.

DETAILED DESCRIPTION OF EMBODIMENTS

The technical solutions of the embodiments of the present application will be described below clearly and comprehensively in conjunction with the drawings of the embodiments of the present disclosure. Clearly, the embodiments described are merely some embodiments of the present disclosure and are not all the possible embodiments. Based on the embodiments given in the present disclosure, all other embodiments that would be obtained by those of ordinary skill in the art without expending inventive effort shall all fall within the scope of protection of the present disclosure.

An embodiment of the present disclosure provides a sample analyzer. The sample analyzer can be used for analyzing biological samples, which can be samples of blood, urine, etc. The sample analyzer includes a sampling assembly for collecting and distributing biological samples. The sample analyzer further includes a driving assembly, a reactor assembly, a testing assembly, a waste fluid treatment assembly and a controller. The driving assembly is used for driving various flow paths (including gas paths and fluid paths) in the sample analyzer. The reactor assembly is used for processing the biological sample to form a fluid to be tested. The testing assembly is used for testing the fluid to be tested to form test information. The waste fluid treatment assembly is used for collecting and discharging waste fluid in the sample analyzer. The controller is used for controlling the working flow of the sample analyzer and processing the test information to form an analysis result.

First Embodiment

Figure 1:
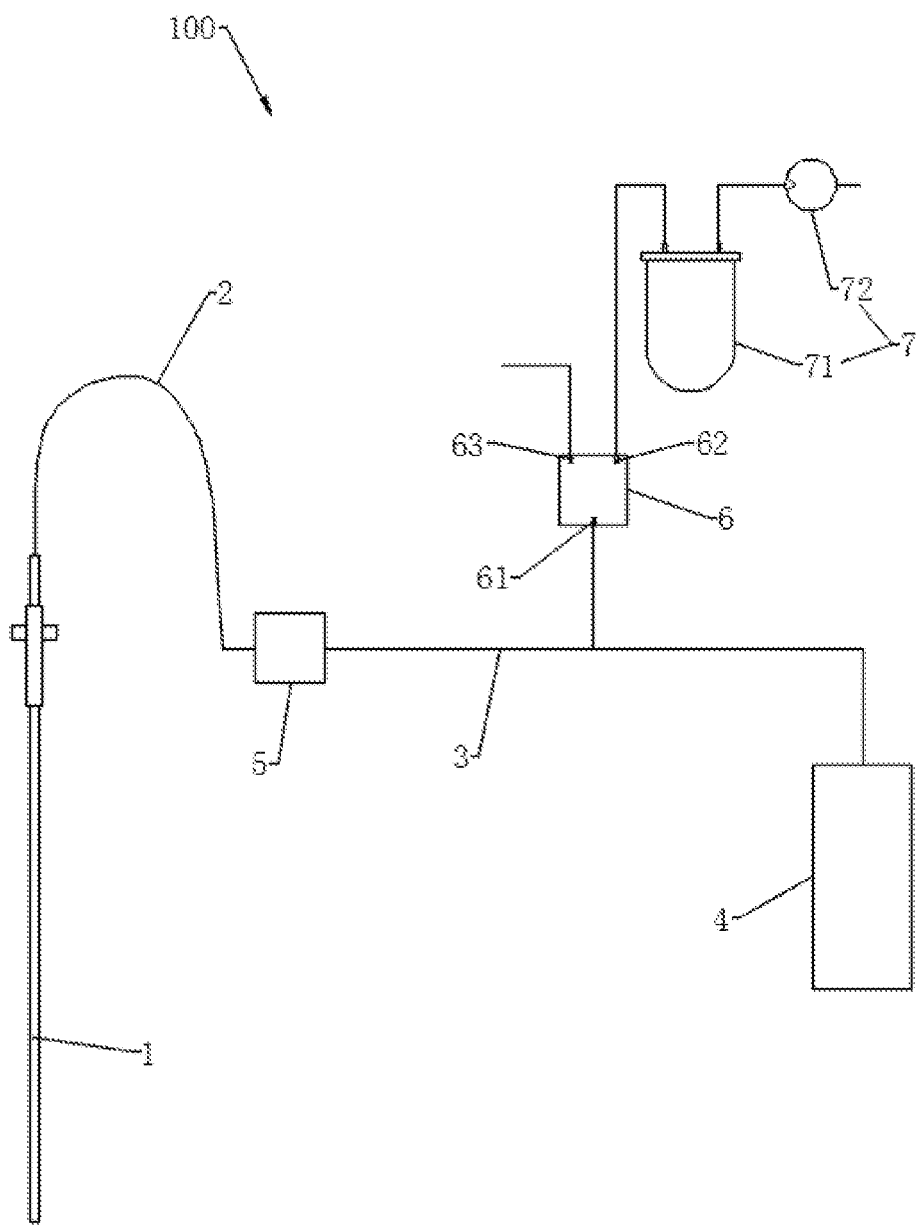
FIG. 1 is a schematic diagram of an implementation of a sampling assembly provided by an embodiment of the present disclosure.
Figure 2:
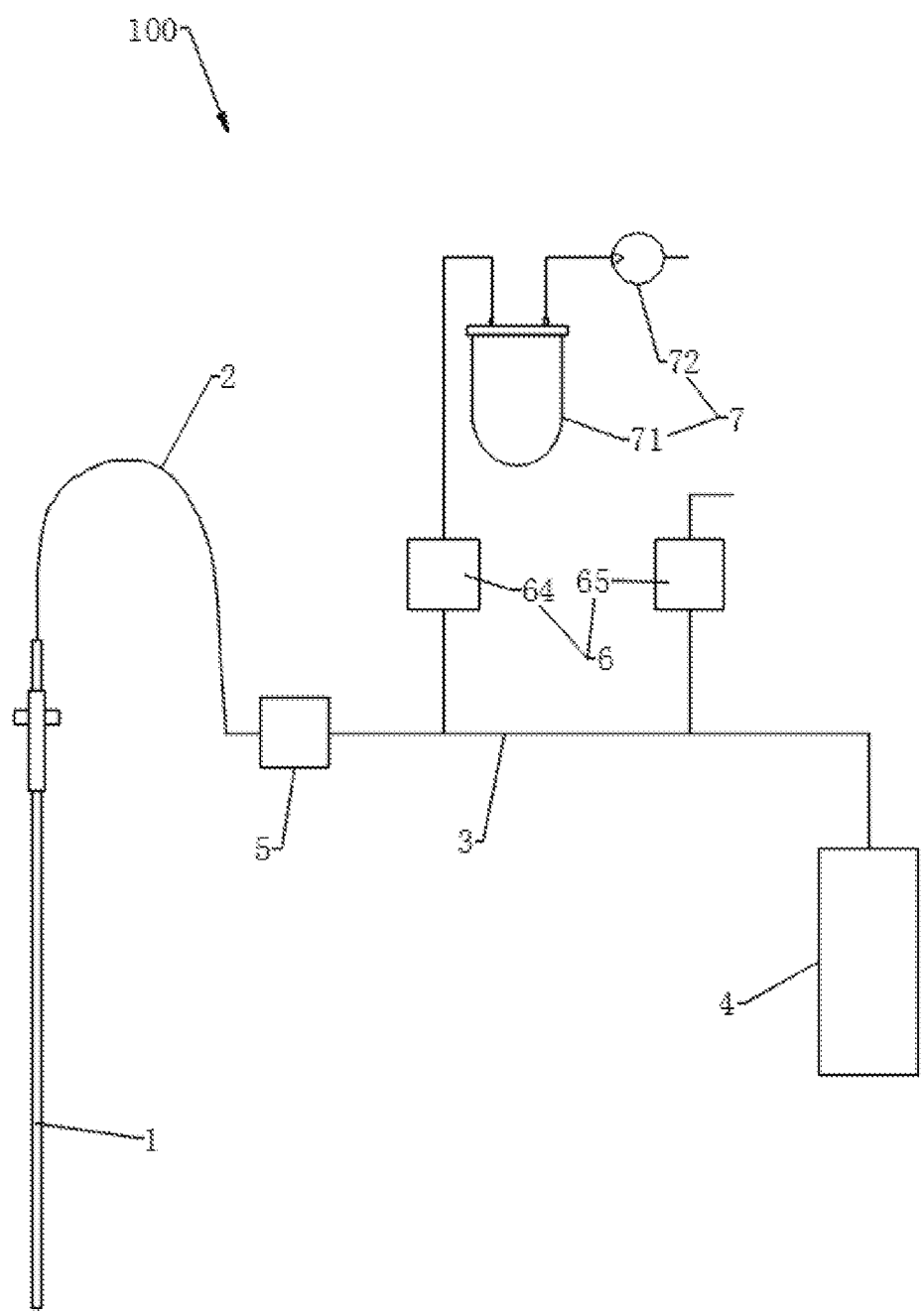
FIG. 2 is a schematic diagram of another implementation of a sampling assembly provided by an embodiment of the present disclosure.

Referring to FIGS. 1 and 2 together, the sampling assembly 100 in this embodiment includes a sampling needle 1, a first pipeline 2, a second pipeline 3, a driving member 4, a first switching member 5 and a second switching member 6. The first pipeline 2 is coupled between the sampling needle 1 and the first switching member 5. The second pipeline 3 is coupled between the first switching member 5 and the driving member 4. The first switching member 5 is used for connecting or disconnecting the first pipeline 2 to or from the second pipeline 3. The second pipeline 3 can be connected to a negative pressure source 7 and the atmosphere via the second switching member 6.

In this embodiment, the sampling assembly 100 can control the pressure environment of the first pipeline 2 through motions of the first switching member 5 and the second switching member 6, thereby eliminating the adverse influence of the pressure in the sealed test tube on the sampling accuracy. Therefore, when the sampling assembly 100 is used for sampling, the sampling can be achieved simply by puncturing with the sampling needle 1 once, and the procedures of puncture pretreatment (puncture pretreatment usually takes more than several seconds) and cleaning the sampling needle 1 after the puncture pretreatment are no longer needed, thus shortening the sampling time and improving the sampling speed. Since the sampling process is a key path for measurement of the sample analyzer, sampling by the sampling assembly 100 shortens the measurement time of the sample analyzer and improves the measurement speed of the sample analyzer. Moreover, only one puncture is needed for sampling by using the sampling assembly 100, so that the wear of the sampling needle 1 can be reduced as well, thus prolonging the service life of the sampling needle 1.

In an implementation, as shown in FIG. 1, the second switching member 6 includes a first port 61, a second port 62 and a third port 63. The first port 61 is connected to the second pipeline 3, the second port 62 is connected to the negative pressure source 7, the third port 63 is connected to the atmosphere, and the second switching member 6 can connect the first port 61 to the second port 62 or connect the first port 61 to the third port 63. The second switching member 6 may be a valve, such as a two-position three-way solenoid valve.

In another implementation, as shown in FIG. 2, the second switching member 6 includes a first sub-switching member 64 and a second sub-switching member 65. Two ends of the first sub-switching member 64 are coupled to the second pipeline 3 and the negative pressure source 7, respectively, the first sub-switching member 64 being used for connecting or disconnecting the second pipeline 3 to or from the negative pressure source 7. The first sub-switching member 64 may be a valve, such as a stop valve. Two ends of the second sub-switching member 65 are connected to the second pipeline 3 and the atmosphere, respectively, the second sub-switching member 65 being used for connecting or disconnecting the second pipeline 3 to or from the atmosphere. The second sub-switching member 65 may be a valve, such as a stop valve.

Alternatively, the negative pressure source 7 includes a gas storage tank 71, negative pressure is formed in the gas storage tank 71, and the gas storage tank 71 is connected to the second pipeline 3 to cause the second pipeline 3 to be in a negative pressure state. The negative pressure source 7 may further comprise a gas pump 72. The gas pump 72 is for connecting to the gas storage tank 71 to establish the negative pressure in the gas storage tank 71.

The pressure value of the negative pressure in the gas storage tank 71 is less than or equal to −30 kPa. When the second pipeline 3 is connected to the gas storage tank 71, the pressure in the second pipeline 3 is the same as that in the gas storage tank 71, so that the pressure in the second pipeline 3 is lower than the negative pressure in the test tube.

Alternatively, the driving member 4 includes a syringe for enabling the sampling needle 1 to draw a certain amount of biological sample. In other implementations, the driving member 4 may also comprise a dosing pump or other devices capable of drawing a specific amount of fluid.

Referring to FIGS. 1 to 5 together, as an alternative embodiment, the sampling needle 1 includes a needle body 12 and a needle head 13 which are arranged in the direction of a lengthwise axis 11. The needle body 12 and the needle head 13 are internally provided with a fluid passage 14 in communication with each other. The fluid passage 14 extends in the direction of the lengthwise axis 11 with an opening 141 at one end arranged in the needle head 13. The opening 141 is used for drawing and discharging biological samples. The needle body 12 has a closed outer surface. The needle head 13 includes a tip portion 131, the tip portion 131 includes a first end 1311, a second end 1312, and a smooth side surface 1313 extending between the first end 1311 and the second end 1312. The first end 1311 of the tip portion 131 is arranged on a side away from the needle body 12, the second end 1312 thereof is arranged on a side close to the needle body 12, and the tip portion is a blunt end. The second end 1312 is located between the first end 1311 and the needle body 12. The blunt end includes, but is not limited to, a flat end or a cambered end.

In this application, since the first end 1311 of the tip portion 131 of the needle head 13 is provided as a blunt end and the side surface 1313 coupled between the first end 1311 and the second end 1312 is a smooth surface, the sampling needle 1 can avoid cutting the cap of the test tube due to a too sharp needle head 13, so that the sampling needle 1 produces less debris during the puncture. Since the needle body 12 has a closed outer surface, the needle body 12 is not provided with a venting groove, the processing technology of the sampling needle 1 is simplified, and therefore debris generated by the venting groove cutting the cap of the test tube can also be avoided.

Alternatively, the fluid passage 14 extends from the needle head 13 to the needle body 12 in the direction of the lengthwise axis 11. The fluid passage 14 extends through the needle body 12. The fluid passage 14 draws and discharges the biological sample through the opening 141 provided in the needle head 13.

Figure 5:
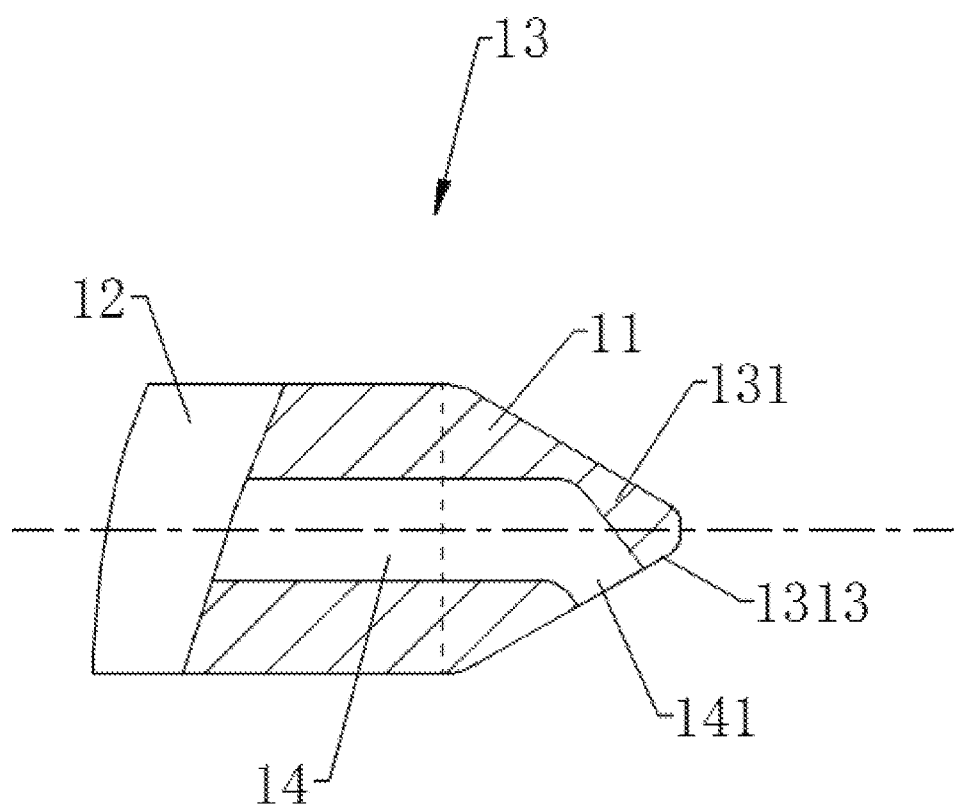
FIG. 5 is a schematic structure diagram of another implementation of a sampling needle of the sampling assembly shown in FIG. 1.

Alternatively, as shown in FIG. 5, the opening 141 at one end of the fluid passage 14 is arranged in the side surface 1313 of the tip portion 131.

Alternatively, the shape of any cross section of the needle body 12 in a direction perpendicular to the lengthwise axis 11 is circular or elliptical. The needle body 12 is generally a hollow cylinder or elliptic cylinder.

Alternatively, the tip portion 131 is a conical structure or a truncated conical structure that tapers from its second end 1312 to its first end 1311. In this case, the shape of the cross section of the side surface 1313 perpendicular to the lengthwise axis 11 is circular, and the side surface 1313 is a rounded surface, which can avoid cutting the cap of the test tube.

Alternatively, the first end 1311 of the tip portion 131 is coupled to the side surface 1313 via a first transition cambered surface 132, and the radius of the first transition cambered surface 132 is less than or equal to 0.1 mm. The first transition cambered surface 132 makes the outer surface 1331 of the tip portion 131 even smoother, which can further reduce the risk of cutting the cap of the test tube.

Alternatively, an extension direction of the side surface 1313 of the tip portion 131 forms a first included angle A with respect to the lengthwise axis 11, and the first included angle A is greater than or equal to 20° and less than or equal to 40°. The first included angle A may be 30°. In this case, the area of the cross section of the tip portion 131 perpendicular to the lengthwise axis 11 gradually increases from the first end 1311 to the second end 1312, so that the tip portion 131 can smoothly pass through the cap of the test tube and the difficulty in puncture is reduced for the sampling needle 1.

Alternatively, a radial dimension of the second end 1312 of the tip portion 131 is greater than or equal to one-half of a radial dimension of the needle body 12. In this case, the tip portion 131 makes a larger through-hole in the cap of the test tube, and the radial dimension of the through-hole is greater than or equal to half of the radial dimension of the needle body 12, so that the needle body 12 can smoothly pass through the through-hole under a small acting force and the difficulty in puncture is reduced for the sampling needle 1.

Figure 3:
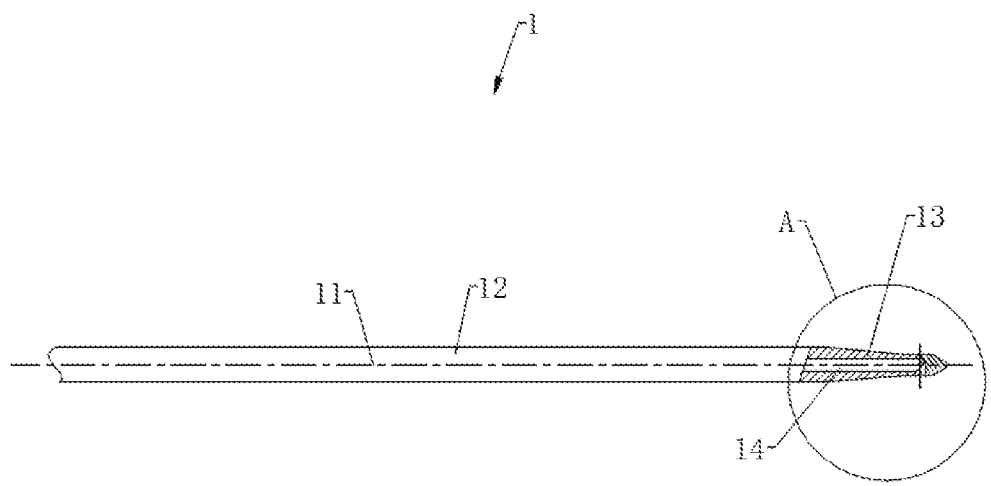
FIG. 3 is a schematic structure diagram of an implementation of a sampling needle of the sampling assembly shown in FIG. 1.
Figure 4:
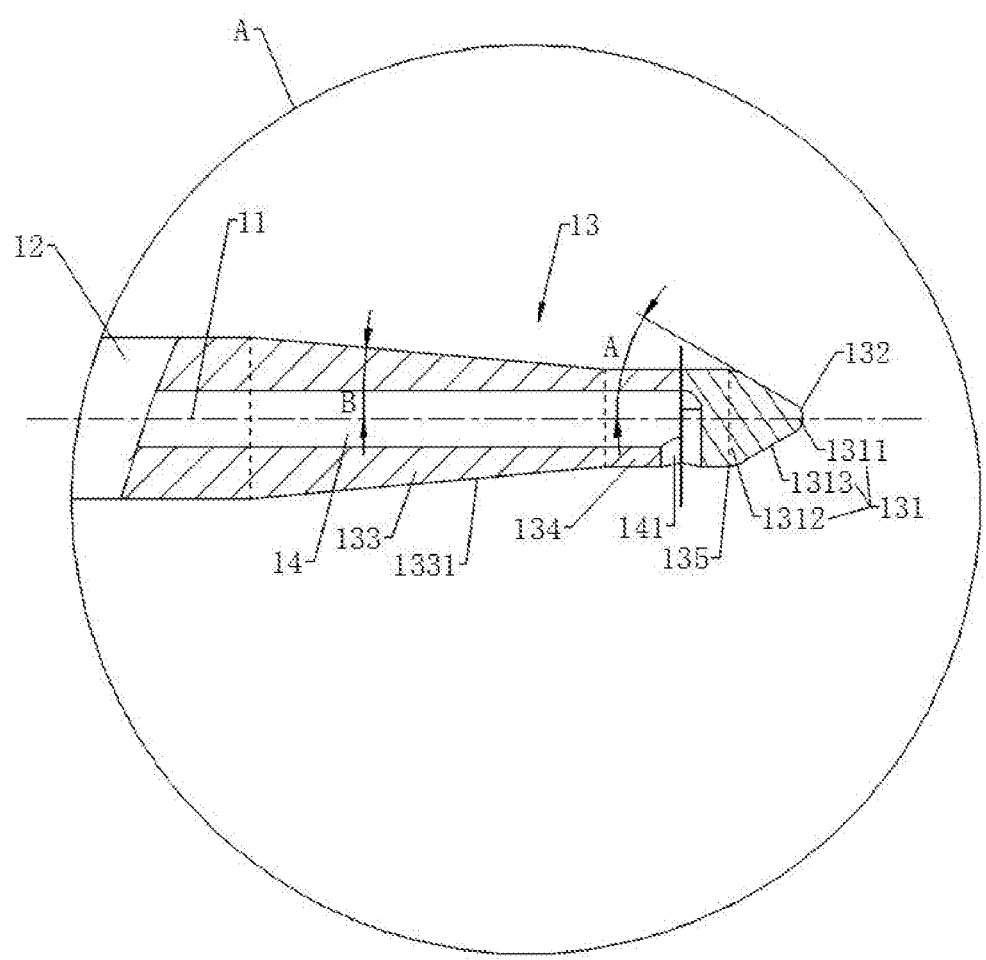
FIG. 4 is an enlarged view of the structure at A in FIG. 3.

Referring to FIGS. 3 and 4 together, as an alternative embodiment, the needle head 13 further includes a first transition portion 133, and the first transition portion 133 is positioned between the needle body 12 and the tip portion 131 and is coupled to the needle body 12 and the tip portion 131. One end of the first transition portion 133 that is coupled to the tip portion 131 has a first radial dimension, and one end of the first transition portion 133 that is coupled to the needle body 12 has a second radial dimension, the first radial dimension being less than the second radial dimension. When puncture is performed with the sampling needle 1, the first transition portion 133 can further enlarge the radial dimension of the through-hole in the cap of the test tube made by the sampling needle 1, thereby further reducing the difficulty in puncture for the sampling needle 1.

Alternatively, the first transition portion 133 includes an outer surface 1331 extending between the two ends thereof, an extension direction of the outer surface 1331 forms a second included angle B with respect to the lengthwise axis 11, and the second included angle B is less than or equal to 10°. The second included angle B may be 5°. In this case, the area of the cross section of the first transition portion 133 perpendicular to the lengthwise axis 11 gradually increases from the end coupled to the tip portion 131 to the end coupled to the needle body 12 to reduce the difficulty in puncture for the sampling needle 1.

Alternatively, the first transition portion 133 is a truncated cone structure having a smooth outer surface 1331, the first radial dimension is less than the radial dimension of the needle body 12, and the second radial dimension is equal to the radial dimension of the needle body 12. In this case, with the tip portion 131 and the first transition portion 133, the needle head 13 causes the through-hole made in the cap of the test tube by the sampling needle 1 to have a radial dimension equal to the radial dimension of the needle body 12, thereby further reducing the difficulty in puncture for the sampling needle 1.

In the direction of the lengthwise axis 11, the size of the tip portion 131 is smaller than the size of the first transition portion 133, such that the sampling needle 1 can quickly make a through-hole in the cap of the test tube and then slowly enlarge the through-hole.

Referring to FIGS. 3 and 4 together, as an alternative embodiment, the needle head 13 further includes a second transition portion 134, and the second transition portion 134 is located between the first transition portion 133 and the tip portion 131 and is coupled to the first transition portion 133 and the tip portion 131. The second transition portion 134 is coupled to the second end 1312 of the tip portion 131 via a second transition cambered surface 135, and the radius of the second transition cambered surface 135 is 0.1 mm to 1 mm, for example, 0.5 mm. The second transition cambered surface 135 makes the outer surface 1331 of the needle head 13 even smoother, which can further reduce the risk of cutting the cap of the test tube.

Alternatively, as shown in FIG. 4, the opening 141 at one end of the fluid passage 14 is arranged in the second transition portion 134, and an included angle of more than 0° and less than or equal to 90° is formed between the direction of the opening 141 and the direction of the lengthwise axis 11. For example, the direction of the opening 141 is substantially perpendicular to the direction of the lengthwise axis 11.

Alternatively, the second transition portion 134 is a cylindrical structure having a constant radial dimension, and the radial dimension of the cylindrical structure is less than the radial dimension of the needle body 12 and equal to the radial dimension of the second end 1312 of the tip portion 131. In this case, since the second transition portion 134 has a cylindrical structure, the second transition portion 134 hardly bears any puncture resistance during the puncture process of the sampling needle 1, and the opening 141 provided in the second transition portion 134 does not cut the cap of the test tube, that is, the sampling needle 1 does not produce debris, so that no debris enters the fluid passage in the sampling needle 1.

Alternatively, the surface roughness of an outer wall of the sampling needle 1 is 0.1 μm to 3.2 μm, for example, 0.2 μm. In this case, the sampling needle 1 has a smooth outer wall, which can reduce puncture resistance. The surface roughness of the outer wall can be realized through an electroplating process.

Second Embodiment

Figure 7:
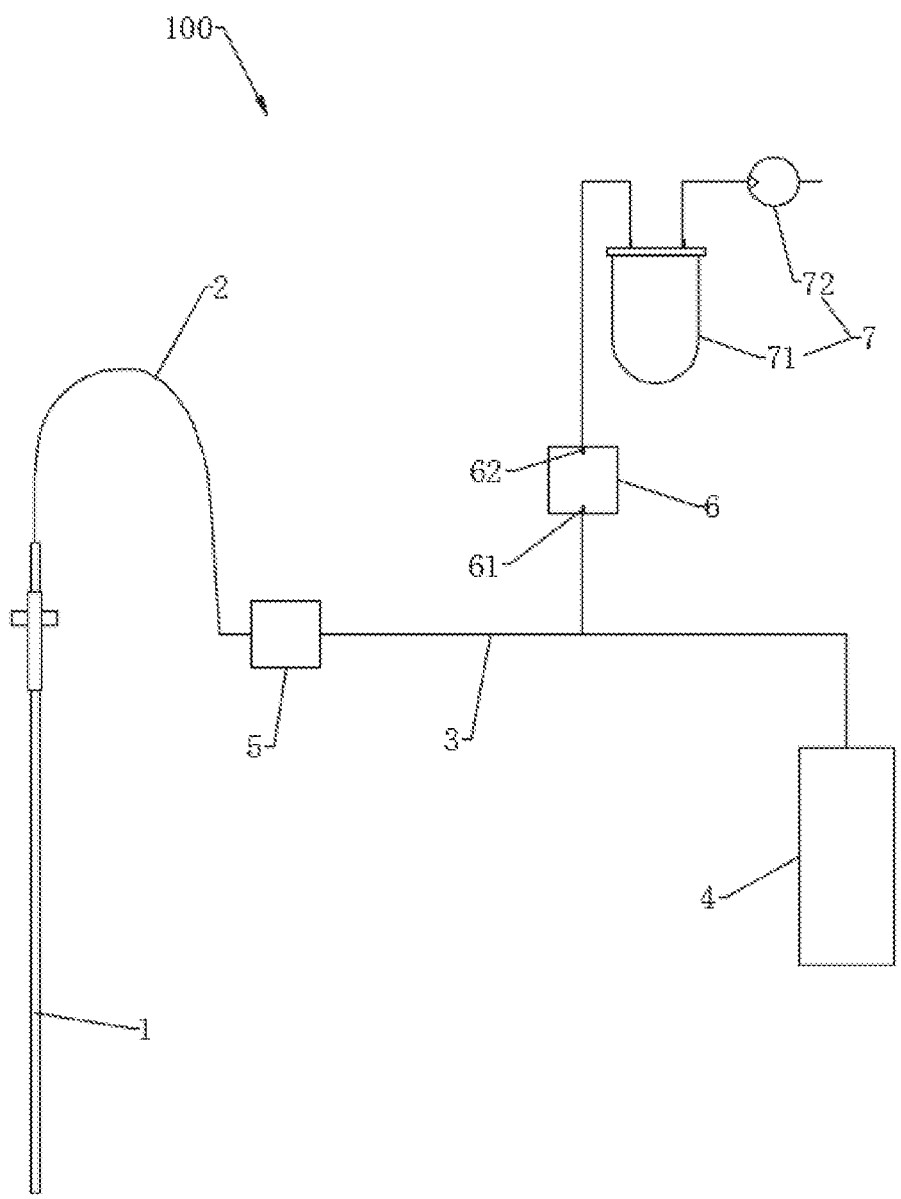
FIG. 7 is a schematic diagram of yet another implementation of a sampling assembly provided by an embodiment of the present disclosure.
Figure 8:
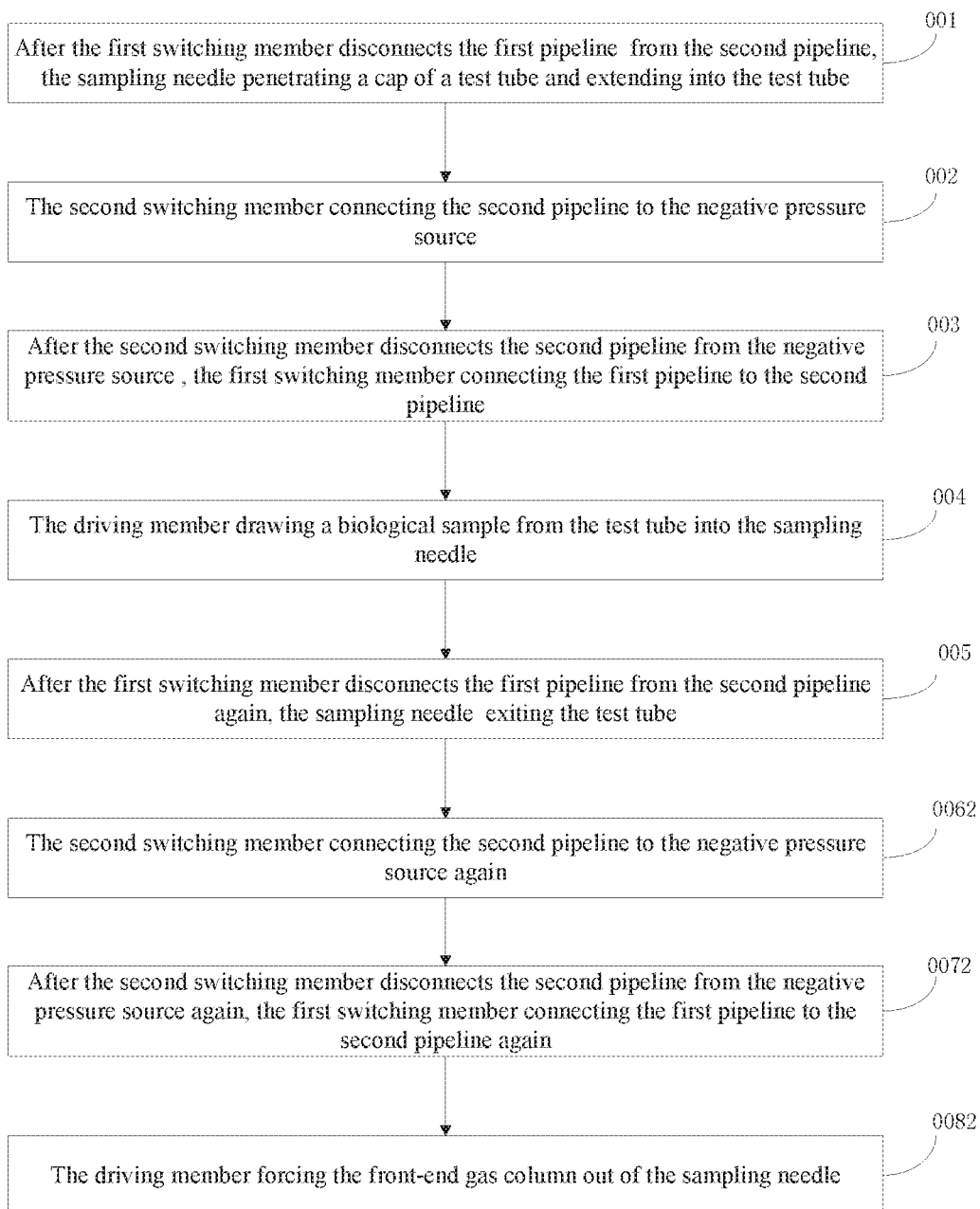
FIG. 8 is a flowchart of another sampling method provided by an embodiment of the present disclosure.

Referring to FIG. 7, the sampling assembly 100 in this embodiment differs from the sampling assembly 100 in the first embodiment in that:

The second switching member 6 includes a first port 61 and a second port 62. The first port 61 is connected to the second pipeline 3. The second port 62 is connected to the negative pressure source 7. The second switching member 6 can connect the first port 61 to the second port 62. In other words, the second pipeline 3 can be connected to the negative pressure source 7 via the second switching member 6.

In this embodiment, the sampling assembly 100 can control the pressure environment of the first pipeline 2 through motions of the first switching member 5 and the second switching member 6, thereby eliminating the adverse influence of the pressure in the sealed test tube on the sampling accuracy. Therefore, when the sampling assembly 100 is used for sampling, the sampling can be achieved simply by puncturing with the sampling needle 1 once, and the procedures of puncture pretreatment (puncture pretreatment usually takes more than several seconds) and cleaning the sampling needle 1 after the puncture pretreatment are no longer needed, thus shortening the sampling time and improving the sampling speed. Since the sampling process is a key path for measurement of the sample analyzer, sampling by the sampling assembly 100 shortens the measurement time of the sample analyzer and improves the measurement speed of the sample analyzer. Moreover, only one puncture is needed for sampling by using the sampling assembly 100, so that the wear of the sampling needle 1 can be reduced as well, thus prolonging the service life of the sampling needle 1.

The second switching member 6 may be a valve, such as a stop valve.

An embodiment of the present disclosure further provides a sampling method which is applied to the sample analyzer described above. The sampling method can use the sampling assembly 100 described in the above embodiment for sampling.

In one embodiment, the sampling method can use the sampling assembly 100 (see FIGS. 1 to 5) described in the first embodiment for sampling. The sampling assembly 100 includes a sampling needle 1, a first pipeline 2, a second pipeline 3, a driving member 4, a first switching member 5 and a second switching member 6. The first pipeline 2 is coupled between the sampling needle 1 and the first switching member 5. The second pipeline 3 is coupled between the first switching member 5 and the driving member 4. The first switching member 5 is used for connecting or disconnecting the first pipeline 2 to or from the second pipeline 3. The second pipeline 3 can be connected to the negative pressure source 7 and the atmosphere via the second switching member 6.

Figure 6:
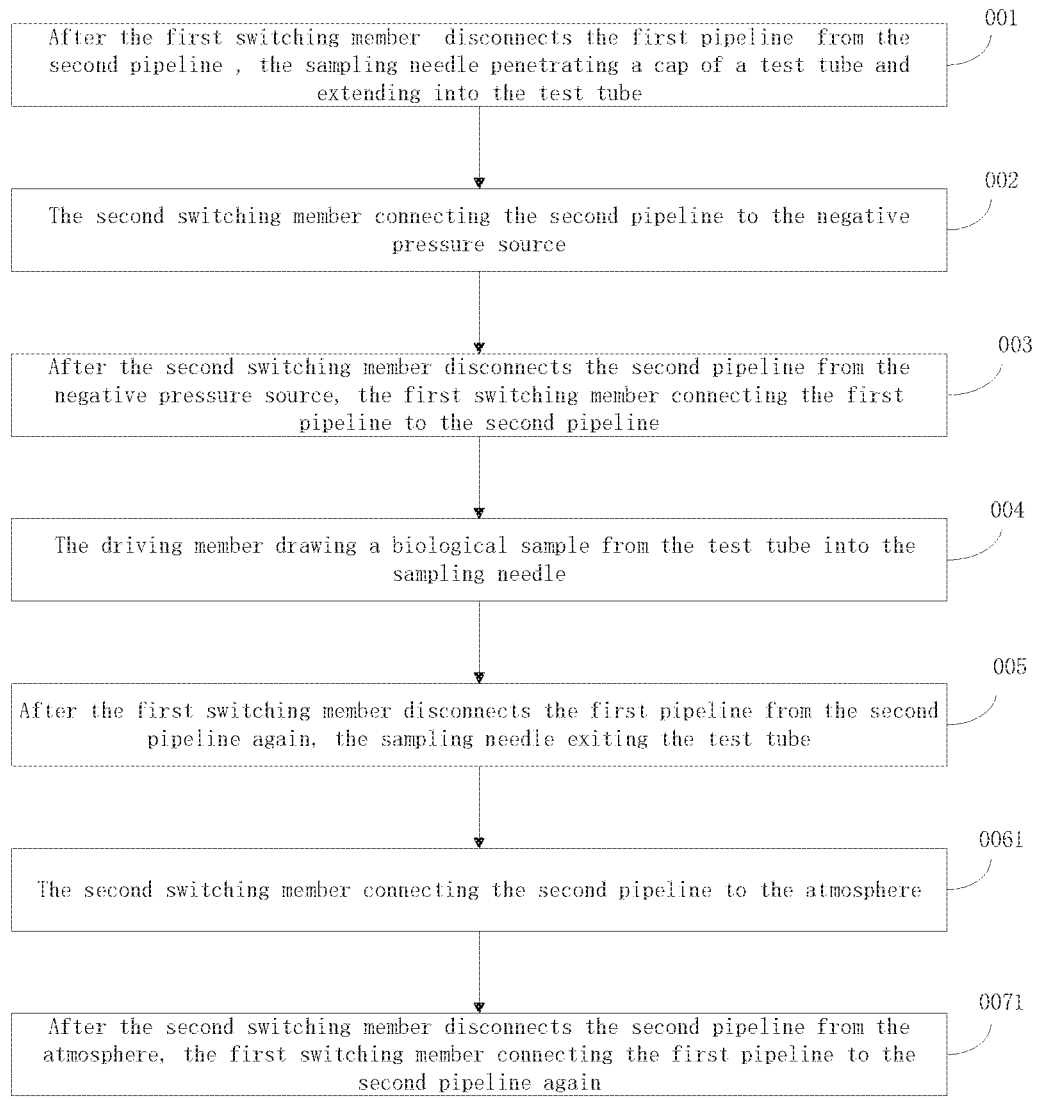
FIG. 6 is a flowchart of a sampling method provided by an embodiment of the present disclosure.

Referring to FIG. 6, the sampling method includes the following steps:

001: after the first switching member 5 disconnects the first pipeline 2 from the second pipeline 3, the sampling needle 1 penetrating a cap of a test tube and extending into the test tube;

002: the second switching member 6 connecting the second pipeline 3 to the negative pressure source 7;

003: after the second switching member 6 disconnects the second pipeline 3 from the negative pressure source 7, the first switching member 5 connecting the first pipeline to the second pipeline 3;

004: the driving member 4 drawing a biological sample from the test tube into the sampling needle 1;

005: after the first switching member 5 disconnects the first pipeline 2 from the second pipeline 3 again, the sampling needle 1 exiting the test tube;

0061: the second switching member 6 connecting the second pipeline 3 to the atmosphere; and 0071: after the second switching member 6 disconnects the second pipeline 3 from the atmosphere, the first switching member 5 connecting the first pipeline 2 to the second pipeline 3 again.

In step 001, an isolation gas column is formed at the end of the sampling needle 1 away from the second pipeline 3. The isolation gas column can isolate the fluid in the first pipeline 2 from the biological sample drawn later, thus avoiding inaccurate test results of the sample analyzer caused by the pollution to the biological sample from the fluid in the first pipeline 2. The sampling needle 1 is extended into the test tube after the first pipeline 2 is disconnected from the second pipeline 3 by the first switching member 5, and thus the deformation of the second pipeline 3 can be prevented from affecting the isolation gas column in the first pipeline 2. If the sampling needle 1 extends into the test tube under the condition that the first pipeline 2 is connected to the second pipeline 3, the second pipeline 3 is prone to deformation due to the pressure difference formed between the pressure in the test tube and the pressure in the second pipeline 3, which in turn causes the isolation gas column to be obviously shortened or disappear, resulting in pollution from the fluid in the first pipeline 2 to the biological sample drawn later and thus an inaccurate analysis result of the sample analyzer.

In step 002, the negative pressure source 7 enables the interior of the second pipeline 3 to be in a negative pressure state, so that the influence of the negative pressure in the test tube on the isolation gas column can be offset.

In step 003, after the first pipeline 2 is connected to the second pipeline 3, the pressure in the first pipeline 2 is the same as the pressure in the second pipeline 3, and the pressure in the first pipeline 2 is slightly lower than or equal to the pressure in the test tube. When the pressure in the first pipeline 2 is slightly lower than the pressure in the test tube, a small amount of the biological sample (a front section sample) in the test tube enters the sampling needle 1 under the action of pressure difference, and the isolation gas column isolates the biological sample from the fluid in the first pipeline 2.

In step 004, a larger amount of the biological sample (a rear section sample) in the test tube enters the sampling needle 1 under the driving force of the driving member 4.

In step 005, the sampling needle 1 exits the test tube after the first pipeline 2 is disconnected from the second pipeline 3 by the first switching member 5, and thus the deformation of the second pipeline 3 can be prevented from affecting the isolation gas column, the front section sample and the rear section sample. In this case, a very short gas column is formed at one end of the sampling needle 1 away from the second pipeline 3. In the sampling needle 1, the isolation gas column, the front section sample, the rear section sample and the gas column are sequentially arranged.

In this embodiment, the biological sample can be accurately collected into the sampling needle 1 through steps 001 to 005. The sampling method eliminates the adverse influence of the pressure in the sealed test tube on the sampling accuracy by controlling the pressure environment of the first pipeline 2. By using the sampling method, the sampling can be achieved simply by puncturing with the sampling needle 1 once, and the procedures of puncture pretreatment (puncture pretreatment usually takes more than several seconds) and cleaning the sampling needle 1 after the puncture pretreatment are no longer needed in the sampling method, thus shortening the sampling time and improving the sampling speed. Since the sampling process is a key path for measurement of the sample analyzer, the sampling method shortens the measurement time of the sample analyzer and improves the measurement speed of the sample analyzer. Moreover, only one puncture is needed for the sampling method, so that the wear of the sampling needle 1 can be reduced as well, thus prolonging the service life of the sampling needle 1.

It can be understood that the present disclosure controls the pressure environment in the first pipeline 2 and the second pipeline 3 through the first switching member 5 and the second switching member 6. The switching motion of the first switching member 5 and the second switching member 6 is simple and efficient, which is conducive to the accurate and efficient implementation of the sampling method.

Experiments prove that after sampling by using the described sampling method, the shift of the biological sample in the sampling needle 1 can be controlled below ±0.3 μl. A part in the rear section sample is taken as a measurement blood section, and isolation blood sections (such as the front section sample) are reserved before and after the measurement blood section, thereby eliminating the influence caused by shift of the biological sample. Therefore, the sampling method has high sampling accuracy, and the sampling method is beneficial to ensuring the test accuracy of the sample analyzer. The sampling method can be applied to a low-cost puncture-needle blood sampling and dispensing platform using a resistance technology method.

In step 0061, the second pipeline 3 is connected to the atmosphere to release pressure, and the pressure environment of the second pipeline 3 is consistent with the pressure environment of the end of the sampling needle 1 away from the second pipeline 3.

In step 0071, since the pressure environment of the second pipeline 3 is consistent with the pressure environment of the end of the sampling needle 1 away from the second pipeline 3, the biological sample in the sampling needle 1 hardly shifts or shakes, which is beneficial to the accuracy of the subsequent biological sample dispensing action of the sample analyzer and improves the analysis accuracy of the sample analyzer. After step 0071, the driving member 4 can force the biological sample in the sampling needle 1 outward to dispense the biological sample.

In this embodiment, through steps 0061 and 0071, the biological sample in the sampling needle 1 can be kept from falling off from the sampling needle 1 and hardly shift or shake in the sampling needle 1, thus improving the accuracy of the subsequent biological sample dispensing action of the sample analyzer.

Alternatively, the step of "the sampling needle 1 penetrating a cap of a test tube and extending into the test tube" and the step of "the second switching member 6 connecting the second pipeline 3 to the negative pressure source 7" are performed simultaneously. Since the first switching member 5 isolates the first pipeline 2 from the second pipeline 3, the two do not affect each other anymore. Therefore, the step of "the sampling needle 1 penetrating a cap of a test tube and extending into the test tube" and the step of "the second switching member 6 connecting the second pipeline 3 to the negative pressure source 7" can be performed simultaneously, thus further shortening the sampling time of the sampling method. Of course, the step of "the second switching member 6 connecting the second pipeline 3 to the negative pressure source 7" can also be performed after the step of "the sampling needle 1 penetrating a cap of a test tube and extending into the test tube" is finished.

Alternatively, the step of "the sampling needle 1 exiting the test tube" and the step of "the second switching member 6 connecting the second pipeline 3 to the atmosphere" are performed simultaneously. Since the first switching member 5 isolates the first pipeline 2 from the second pipeline 3, the two do not affect each other anymore. Therefore, the step of "the sampling needle 1 exiting the test tube" and the step of "the second switching member 6 connecting the second pipeline 3 to the atmosphere" can be performed simultaneously, thus further shortening the sampling time of the sampling method. Of course, the step of "the second switching member 6 connecting the second pipeline 3 to the atmosphere" can also be performed after the step of "the sampling needle 1 exiting the test tube" is finished.

Alternatively, the step of "the sampling needle 1 penetrating a cap of a test tube and extending into the test tube" includes the following steps:

0011: the sampling needle 1 penetrating a cap of a test tube and extending into the test tube, and remaining therein for a predetermined time after entering;

0012: the sampling needle 1 continuing to extend further into the test tube to immerse the needle head 13 of the sampling needle 1 into the biological sample.

The predetermined time can be used to balance the pressure in the first pipeline 2 and the pressure in the test tube.

In other implementations, the sampling needle 1 can penetrate the cap of the test tube at a uniform speed and immerse the needle head 13 of the sampling needle 1 into the biological sample.

In another embodiment, the sampling method can use the sampling assembly described in the second embodiment (see FIG. 7) for sampling. A sampling assembly 100 includes a sampling needle 1, a first pipeline 2, a second pipeline 3, a driving member 4, a first switching member 5 and a second switching member 6. The first pipeline 2 is coupled between the sampling needle 1 and the first switching member 5. The second pipeline 3 is coupled between the first switching member 5 and the driving member 4. The first switching member 5 is used for connecting or disconnecting the first pipeline 2 to or from the second pipeline 3. The second pipeline 3 can be connected to the negative pressure source 7 via the second switching member 6.

The sampling method includes the following steps:

001: after the first switching member 5 disconnects the first pipeline 2 from the second pipeline 3, the sampling needle 1 penetrating a cap of a test tube and extending into the test tube;

002: the second switching member 6 connecting the second pipeline 3 to the negative pressure source 7;

003: after the second switching member 6 disconnects the second pipeline 3 from the negative pressure source 7, the first switching member 5 connecting the first pipeline 2 to the second pipeline 3;

004: the driving member 4 drawing a biological sample from the test tube into the sampling needle 1;

005: after the first switching member 5 disconnects the first pipeline 2 from the second pipeline 3 again, the sampling needle 1 exiting the test tube;

0062: the second switching member 6 connecting the second pipeline 3 to the negative pressure source 7 again; and 0072: after the second switching member 6 disconnects the second pipeline 3 from the negative pressure source 7 again, the first switching member 5 connecting the first pipeline 2 to the second pipeline 3 again.

In step 001, an isolation gas column is formed at the end of the sampling needle 1 away from the second pipeline 3. The isolation gas column can isolate the fluid in the first pipeline 2 from the biological sample drawn later, thus avoiding inaccurate test results of the sample analyzer caused by the pollution to the biological sample from the fluid in the first pipeline 2. The sampling needle 1 is extended into the test tube after the first pipeline 2 is disconnected from the second pipeline 3 by the first switching member 5, and thus the deformation of the second pipeline 3 can be prevented from affecting the isolation gas column in the first pipeline 2. If the sampling needle 1 extends into the test tube under the condition that the first pipeline 2 is connected to the second pipeline 3, the second pipeline 3 is prone to deformation due to the pressure difference formed between the pressure in the test tube and the pressure in the second pipeline 3, which in turn causes the isolation gas column to be obviously shortened or disappear, resulting in pollution from the fluid in the first pipeline 2 to the biological sample drawn later and thus an inaccurate analysis result of the sample analyzer.

In step 002, the negative pressure source 7 enables the interior of the second pipeline 3 to be in a negative pressure state, so that the influence of the negative pressure in the test tube on the isolation gas column can be offset.

In step 003, after the first pipeline 2 is connected to the second pipeline 3, the pressure in the first pipeline 2 is the same as the pressure in the second pipeline 3, and the pressure in the first pipeline 2 is slightly lower than or equal to the pressure in the test tube. When the pressure in the first pipeline 2 is slightly lower than the pressure in the test tube, a small amount of the biological sample (a front section sample) in the test tube enters the sampling needle 1 under the action of pressure difference, and the isolation gas column isolates the biological sample from the fluid in the first pipeline 2.

In step 004, a larger amount of the biological sample (a rear section sample) in the test tube enters the sampling needle 1 under the driving force of the driving member 4.

In step 005, the sampling needle 1 exits the test tube after the first pipeline 2 is disconnected from the second pipeline 3 by the first switching member 5, and thus the deformation of the second pipeline 3 can be prevented from affecting the isolation gas column, the front section sample and the rear section sample. In this case, a very short front-end gas column is formed at one end of the sampling needle 1 away from the first pipeline 2. In the sampling needle 1, the isolation gas column, the front section sample, the rear section sample and the front-end gas column are sequentially arranged.

In this embodiment, the biological sample can be accurately collected into the sampling needle 1 through steps 001 to 005. The sampling method eliminates the adverse influence of the pressure in the sealed test tube on the sampling accuracy by controlling the pressure environment of the first pipeline 2. By using the sampling method, the sampling can be achieved simply by puncturing with the sampling needle 1 once, and the procedures of puncture pretreatment (puncture pretreatment usually takes more than several seconds) and cleaning the sampling needle 1 after the puncture pretreatment are no longer needed in the sampling method, thus shortening the sampling time and improving the sampling speed. Since the sampling process is a key path for measurement of the sample analyzer, the sampling method shortens the measurement time of the sample analyzer and improves the measurement speed of the sample analyzer. Moreover, only one puncture is needed for the sampling method, so that the wear of the sampling needle 1 can be reduced as well, thus prolonging the service life of the sampling needle 1.

It can be understood that the present disclosure controls the pressure environment in the first pipeline 2 and the second pipeline 3 through the first switching member 5 and the second switching member 6. The switching motion of the first switching member 5 and the second switching member 6 is simple and efficient, which is conducive to the accurate and efficient implementation of the sampling method.

Experiments prove that the sampling method has high sampling accuracy, and the sampling method is beneficial to ensuring the test accuracy of the sample analyzer. The sampling method can be applied to a low-cost puncture-needle blood sampling and dispensing platform using a resistance technology method.

In step 0062, the second pipeline 3 is connected to the negative pressure source 7 again, such that the interior of the second pipeline 3 is in a negative pressure state.

In step 0072, the biological sample in the sampling needle 1 will move towards the interior of the sampling needle 1 by a fixed displacement due to the negative pressure state in the second pipeline 3. As the negative pressure state in the third pipeline 3 is determined and controllable, the numerical value of the fixed displacement of the biological sample can be calculated according to the negative pressure state, and the subsequent sample dispensing action can be set according to the numerical value, thus being beneficial to improvement of the accuracy of the subsequent biological sample dispensing action of the sample analyzer and the analysis accuracy of the sample analyzer. After step 0072, the driving member 4 can force the biological sample in the sampling needle 1 outward to dispense the biological sample.

In this embodiment, through steps 0062 and 0072, the biological sample in the sampling needle 1 can be kept from falling off from the sampling needle 1 and move in the sampling needle 1 by a fixed displacement, thus improving the accuracy of the subsequent biological sample dispensing action of the sample analyzer.

Alternatively, a front-end gas column is formed at one end of the sampling needle 1 away from the first pipeline 2 when the first switching member 5 connects the first pipeline 2 to the second pipeline 3 again.

After the step of "the first switching member 5 connecting the first pipeline 2 to the second pipeline 3 again", the sampling method further includes:

0082: the driving member 4 forcing the front-end gas column out of the sampling needle 1.

In this embodiment, the driving member 4 pushes the biological sample in the sampling needle 1 to force the front-end gas column out. Since in step 0072, the front-end gas column will be formed in the front end of the sampling needle 1 (i.e., the end away from the first pipeline 2) due to the negative pressure state in the second pipeline 3, the front-end gas column can be pushed out of the sampling needle 1 before the biological sample is dispensed, so as to balance the displacement of the biological sample in step 0072, thereby improving the accuracy of the biological sample dispensing action of the sample analyzer.

The distance by which the driving member 4 pushes the biological sample in the sampling needle 1 to move in step 0082 is set according to the fixed displacement of the biological sample in step 0072. In step 0082, the driving member 4 can push out the entire front-end gas column or only part of the front-end gas column according to requirements.

Alternatively, the step of "the sampling needle 1 penetrating a cap of a test tube and extending into the test tube" and the step of "the second switching member 6 connecting the second pipeline 3 to the negative pressure source 7" are performed simultaneously. Since the first switching member 5 isolates the first pipeline 2 from the second pipeline 3, the two do not affect each other anymore. Therefore, the step of "the sampling needle 1 penetrating a cap of a test tube and extending into the test tube" and the step of "the second switching member 6 connecting the second pipeline 3 to the negative pressure source 7" can be performed simultaneously, thus further shortening the sampling time of the sampling method. Of course, the step of "the second switching member 6 connecting the second pipeline 3 to the negative pressure source 7" can also be performed after the step of "the sampling needle 1 penetrating a cap of a test tube and extending into the test tube" is finished.

Alternatively, the step of "the sampling needle 1 exiting the test tube" and the step of "the second switching member 6 connecting the second pipeline 3 to the negative pressure source 7 again" are performed simultaneously. Since the first switching member 5 isolates the first pipeline 2 from the second pipeline 3, the two do not affect each other anymore. Therefore, the step of "the sampling needle 1 exiting the test tube" and the step of "the second switching member 6 connecting the second pipeline 3 to the negative pressure source 7 again" can be performed simultaneously, thus further shortening the sampling time of the sampling method. Of course, the step of "the second switching member 6 connecting the second pipeline 3 to the negative pressure source 7 again" can also be performed after the step of "the sampling needle 1 exiting the test tube" is finished.

Alternatively, the step of "the sampling needle 1 penetrating a cap of a test tube and extending into the test tube" includes:

0011: the sampling needle 1 penetrating a cap of a test tube and extending into the test tube, and remaining therein for a predetermined time after entering;

0012: the sampling needle 1 continuing to extend further into the test tube to immerse the needle head 13 of the sampling needle 1 into the biological sample.

The predetermined time can be used to balance the pressure in the first pipeline 2 and the pressure in the test tube.

Of course, in other implementations, the sampling needle 1 can penetrate the cap of the test tube at a uniform speed and immerse the needle head 13 of the sampling needle 1 into the biological sample.

The embodiments of the present disclosure have been described in detail above, and specific examples are used herein to explain the principles and implementation of the present disclosure. The above description of the embodiments is only used to facilitate understanding of the method of the present disclosure and the core concept thereof. Moreover, for those skilled in the art, there can be modifications in the specific implementation and application scope based on the concept of the present disclosure. To sum up, the content of this specification should not be construed as limiting the present disclosure.

What is claimed is:

1. A sampling assembly, comprising:
   a sampling needle;
   a first pipeline;
   a second pipeline;
   a driving member;
   a first switching member; and
   a second switching member,
   wherein the first pipeline is coupled between the sampling needle and the first switching member, the second pipeline is coupled between the first switching member and the driving member, the first switching member is used for connecting or disconnecting the first pipeline to or from the second pipeline, and the second pipeline is capable of connecting to a negative pressure source via the second switching member.

2. The sampling assembly of claim 1, wherein the second pipeline is further capable of connecting to the atmosphere via the second switching member.

3. The sampling assembly of claim 1, wherein the second switching member comprises a first port and a second port, wherein the first port is connected to the second pipeline, the second port is connected to the negative pressure source, and the second switching member is configured to connect the first port to the second port.

4. The sampling assembly of claim 3, wherein the second switching member further comprises a third port connected to the atmosphere, wherein the second switching member is further configured to connect the first port to the third port.

5. The sampling assembly of claim 1, wherein the negative pressure source comprises a gas storage tank, wherein negative pressure is formed in the gas storage tank, and the gas storage tank is connected to the second pipeline to cause the second pipeline to be in a negative pressure state.

6. The sampling assembly of claim 1, wherein the sampling needle comprises a needle body and a needle head which are arranged in a direction of a lengthwise axis, wherein the needle body and the needle head are internally provided with a fluid passage in communication with each other, and the fluid passage extends in the direction of the lengthwise axis with an opening at one end arranged in the needle head, wherein the needle body has a closed outer surface, wherein the needle head comprises a tip portion, the tip portion comprises a first end, a second end, and a smooth side surface extending between the first end and the second end, wherein the first end of the tip portion is arranged on a side away from the needle body, the second end of the tip portion is arranged on a side close to the needle body, and the tip portion is a blunt end.

7. The sampling assembly of claim 6, wherein the first end of the tip portion is coupled to the side surface via a first transition cambered surface, and a radius of the first transition cambered surface is less than or equal to 0.1 mm.

8. The sampling assembly of claim 6, wherein the needle head further comprises a first transition portion which is positioned between the needle body and the tip portion and is coupled to the needle body and the tip portion, wherein one end of the first transition portion that is coupled to the tip portion has a first radial dimension, and one end of the first transition portion that is coupled to the needle body has a second radial dimension, the first radial dimension being less than the second radial dimension.

9. The sampling assembly of claim 8, wherein the first transition portion comprises an outer surface extending between the two ends thereof, wherein an extension direction of the outer surface forms a second included angle with respect to the lengthwise axis, and the second included angle is less than or equal to 10°.

10. The sampling assembly of claim 8, wherein the first transition portion is a truncated cone structure having a smooth outer surface, wherein the first radial dimension is less than a radial dimension of the needle body, and the second radial dimension is equal to a radial dimension of the needle body.

11. The sampling assembly of claim 8, wherein the needle head further comprises a second transition portion which is located between the first transition portion and the tip portion and is coupled to the first transition portion and the tip portion wherein the second transition portion is coupled to the second end of the tip portion via a second transition cambered surface, and a radius of the second transition cambered surface is 0.1 mm to 1 mm.

12. The sampling assembly of claim 11, wherein the second transition portion is a cylindrical structure having a constant radial dimension, and the radial dimension of the cylindrical structure is less than the radial dimension of the needle body and equal to a radial dimension of the second end of the tip portion.

13. The sampling assembly of claim 6, wherein an outer contour of any cross section of the needle body in a direction perpendicular to the lengthwise axis is circular or elliptical, and the tip portion is a conical structure or a truncated cone structure that tapers from its second end to its first end.

14. A sampling method using a sampling assembly, wherein the sampling assembly comprises a sampling needle, a first pipeline, a second pipeline, a driving member, a first switching member and a second switching member, wherein the first pipeline is coupled between the sampling needle and the first switching member, the second pipeline is coupled between the first switching member and the driving member, the first switching member is used for connecting or disconnecting the first pipeline to or from the second pipeline, and the second pipeline is capable of connecting to a negative pressure source via the second switching member, the sampling method comprising:

penetrating a cap of a test tube and extending into the test tube by using the sampling needle, after the first switching member disconnects the first pipeline from the second pipeline;

connecting the second pipeline to the negative pressure source by using the second switching member;

connecting the first pipeline to the second pipeline by using the first switching member, after the second switching member disconnects the second pipeline from the negative pressure source;

drawing a biological sample from the test tube into the sampling needle by using the driving member; and exiting the sampling needle form the test tube, after the first switching member disconnects the first pipeline from the second pipeline again.

15. The sampling method of claim 14, wherein the second switching member comprises a first port and a second port, wherein the first port is connected to the second pipeline, the second port is connected to the negative pressure source, and the second switching member is capable of connecting the first port to the second port; and after the step of "the first switching member disconnects the first pipeline from the second pipeline again", the sampling method further comprises:

connecting the second pipeline to the negative pressure source again by using the second switching member; and connecting the first pipeline to the second pipeline again by using the first switching member, after the second switching member disconnects the second pipeline from the negative pressure source again.

16. The sampling method of claim 15, wherein forming a front-end gas column at one end of the sampling needle away from the first pipeline when the first switching member connects the first pipeline to the second pipeline again; and after the step of "connecting the first pipeline to the second pipeline again by using the first switching member", the sampling method further comprises:

forcing the front-end gas column out of the sampling needle by using the driving member.

17. The sampling method of claim 14, wherein the second pipeline is also capable of connecting to the atmosphere via the second switching member; and after the step of "the first switching member disconnects the first pipeline from the second pipeline again", the sampling method further comprises:

connecting the second pipeline to the atmosphere by using the second switching member; and connecting the first pipeline to the second pipeline again by using the first switching member, after the second switching member disconnects the second pipeline from the atmosphere.

18. The sampling method of claim 17, wherein the second switching member comprises a first port, a second port and a third port, the first port is connected to the second pipeline, the second port is connected to the negative pressure source, the third port is connected to the atmosphere, and the second switching member is further configured to connect the first port to the second port or connecting the first port to the third port.

19. The sampling method of claim 14, wherein penetrating the cap of the test tube and extending into the test tube by using the sampling needle further comprises:
    penetrating the cap of the test tube and extending into the test tube by using the sampling needle, which remains therein for a predetermined time after entering; and
    continuing to extend further into the test tube to immerse the needle head of the sampling needle into the biological sample by using the sampling needle.

\* \* \* \* \*